July 2, 1963 G. WUNDERLICH ETAL 3,096,432
RECORD CARDS FOR BUSINESS MACHINES AND
MEANS FOR EMBOSSING THE SAME
Filed Dec. 4, 1959

INVENTORS
GERHARD WUNDERLICH
HANS SIPPEL
BY Michael S. Striker
ATTORNEY

United States Patent Office 3,096,432

Patented July 2, 1963

3,096,432

RECORD CARDS FOR BUSINESS MACHINES AND MEANS FOR EMBOSSING THE SAME

Gerhard Wunderlich, Nurnberg, and Hans Sippel, Furth, Bavaria, Germany, assignors to Max Grundig, Furth, Bavaria, Germany Filed Dec. 4, 1959, Ser. No. 857,465
Claims priority, application Germany Dec. 6, 1958
8 Claims. (Cl. 235—61.12)

The present invention relates to improvements in record cards for business machines, e.g. accounting machines or the like, and to means for embossing and perforating or puncturing such cards. More particularly, the invention relates to a record card with certain of its zones embossed and perforated or punctured in a novel manner to facilitate proper setting of the card in a business machine in order that certain printed matter may be applied to its surface. Such cards are used in many types of business machines which usually comprise a sensing element adapted to scan the deformed or embossed zones and to thereupon arrest the card-advancing system when the card is in requisite position for application of printed matter thereto. For example, the sensing element may be of the pivotable type to be angularly displaced upon contact with the embossed or otherwise formed obstruction on an advancing card to arrest the motor of a card-advancing mechanism.

Many types of record cards with deformed or uneven surface areas are already known in the art, together with a great variety of devices for deforming the same. It was also proposed to provide each record card with a strip or band formed with magnetizable areas which come into contact with a sensing element formed as a magnetic button or head and located in the path of the advancing card. A disadvantage of such systems is in that the manufacture and application of magnetizable strips and the manufacture of magnetic heads greatly increase the cost of the cards and of business machines in which the cards are used. In addition, the magnetizable bands add to the thickness of a card stack and, therefore, are undesirable in many types of accounting and similar systems. Moreover, when a business machine is constructed for operation with magnetizable cards, it cannot take any other type of record cards.

It is also known to form a paper card with suitable depressions which are scanned by the sensing element of a business machine as the card advances into a position to receive printed matter. However, the formation of such depressions generates tensions in the paper sheet which may reach such magnitude as to cause the depressed area to snap from the one to the other side of the card upon application of a given pressure against such depressed zones. The sensing mechanism is then unable to arrest the card in a desired position. In addition, a depressed zone, without elimination of internal tensions in its material, seldom retains its shape for long periods of time and, particularly after a number of insertions into and passages through a business machine, cannot be detected by the sensing means.

According to a further prior proposal, a clamp similar to a common paper clip, is applied to each record card. Such systems are objectionable because the clamps occupy too much space and, when a large number of cards is stacked, the height of the card pile is increased out of all proportions at the points where the clamps are connected to the individual cards. A further disadvantage of clamps is in that they cover a considerable area of the card to which they are applied and, therefore, such areas cannot receive printed matter. Moreover, the clamps may damage the forwarding rollers when a card is inserted into the business machine, or they may be accidentally struck by the type carrier when the machine is in actual use.

The above described disadvantages of prior record cards are partially overcome by a more recent proposal according to which a stamping or punching device is used to form variously dimensioned and shaped cutouts in a record card. However, even such systems exhibit many serious drawbacks, among others, because of the formation of cuttings or waste which consist of fragments stamped or cut out from bodies of the cards. Such fragments must be collected in suitable receptacles which are difficult to apply because the space available for such purposes is scarce even in a single-file punching machine and, of course, much scarcer in a double-file machine. Moreover, it is practically unavoidable that at least some stampings or fragments penetrate into the recording system where they may lead to disturbances in the operation of a business machine.

It is also known to cut or perforate a record card in such a way as to form a flap which is only partially separated from the card body and remains connected to one side (preferably the underside) of the record card. However, the danger that a flap will be torn away during the passage of a so-formed record card through the business machine is ever present. In addition, when the card is bent or the flaps subjected to comparatively small pressures, at least some flaps will reenter the cutouts in the card body and remain undetected by the sensing element which then meets no resistance while scanning the exposed major surface of a record card.

According to a further prior proposal, a thin knife or cutter is utilized for forming slits in a record card. The pressures at which the cutter is applied to form a slit must be rather high particularly if the card consists of heavier stock. However, the generation of satisfactory pressures is quite difficult because the cutter is usually very small and cannot stand excessive stresses. In addition, the formation of satisfactory slits in record cards often represents a problem for another reason, namely, because the cards utilized in a single business machine may consist of different stock. Thus, if the cutter and the counter-knife are set for cutting of thin paper sheets, a heavier stock cannot be cut at all or the formation of slits in such heavier stock is very unsatisfactory. On the other hand, if the cutters are selected for use with heavier stock, i.e. thick paper sheets, they will drag a thinner and normally softer sheet into the gap therebetween and will frequently destroy or at least damage the record card. It was further observed that, if a record card is inadvertently bent or otherwise deformed, the raised edges surrounding a slit will disappear, i.e. the surface of the card is smoothed out so that the location of slits cannot be detected by the sensing element of a business machine. This will also occur if a slitted record card, particularly one made of comparatively soft material, must pass frequently through a business machine or is stacked in the center or at the bottom of a card pile.

A further very serious drawback of slitted record cards is in that the sensing elements for use therewith must be formed with sensing ends of extremely small dimensions. Thus, if the length of the sensing element is 1 mm. and the length of a slit is 3 mm., the card must be guided with such accuracy that a maximum lateral play of 1 mm. at either side cannot be exceeded; otherwise, the sensing element will miss the raised edges of a selected slit in the record card. In other words, large lateral play of the card during its advance through the business machine cannot be tolerated except by unduly lengthening the slit or by further reducing the dimensions of the sensing element.

Whenever a record card is formed with depressions or with slits whose edges are raised or depressed out of the main plane of the record card, the sensing element must be biased by a spring or the like to bear with a certain force against the surface of the card in order to be caught by the raised edge of a depression or slit in the latter. Owing to constant pressure exerted against the moving record card, the latter may become damaged, particularly if made of comparatively thin and relatively soft material.

An important object of the present invention is to provide an embossed record card which is provided with protuberances adapted to engage with and to actuate the sensing element of a business machine and the like, and in which the protuberances are of such configuration that they cannot be readily depressed into the main plane of the card.

Another important object of the invention is to provide a record card for use in business machines and the like which is embossed and formed with protuberances of such configuration that the protuberances occupy little space on a major surface of the card, whose protuberances retain their shape even if exposed to considerable stresses, and whose protuberances cannot be depressed into its main plane even after repeated and numerous passages through a business machine.

A further object of the instant invention is to provide a record card of the above outlined characteristics whose raised or embossed portions are formed with sharp and very pronounced edges to facilitate engagement with the sensing element of a business machine, and whose raised portions remain practically unchanged regardless of whether the card is made of heavier or of comparatively light and soft stock.

An additional object of the invention is to provide a record card whose raised or embossed portion or portions are capable of properly engaging with and of actuating the sensing element of a business machine even if partially deformed or even if partially returned into the main plane of the card.

A concomitant object of the present invention is to provide a very simple, inexpensive and practical apparatus for embossing a record card in the above outlined manner.

With the above objects in view, the invention resides in the provision of an apparatus for locally deforming or embossing a record card and for simultaneously forming at least one opening or puncture in each embossed zone, preferably at the lowermost or deepest points of such zones. It has been found that, quite surprisingly, a protuberance which is formed with one or more punctures or apertures can withstand friction and deformation much longer than a continuous non-apertured depression or the edges of a slit formed in a paper card.

In its preferred form, each depression or protuberance assumes the shape of a funnel whose bottom is punctured or apertured, or the embossing may consist of a depressed zone or pocket with one or more funnel- or otherwise shaped apertured protuberances extending therefrom.

In its simplest form, the novel embossing apparatus comprises a female die member or matrix formed with one or more bores for reception of embossing elements, preferably assuming the shape of pointed studs which are carried by a reciprocable male die member or ram. A card placed between the die members is punctured by the pointed studs whereby the latter form apertured funnel- or otherwise shaped protuberances; e.g. as an alternative to a hollow conoid shape, the protuberances may assume a pyramidal or similar configuration.

The novel features which are considered as characteristic for the invention are set forth in particular in the appended claims. The invention itself, however, both as to its construction and its method of operation, together with additional objects and advantages thereof, will be best understood from the following detailed description of two specific embodiments when read in connection with the accompanying drawing, in which:

Figure 1:
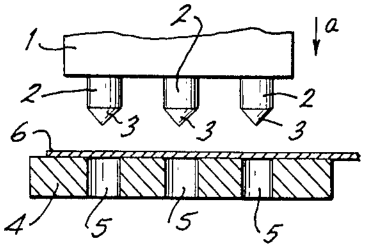
FIG. 1 is partly side elevational and partly sectional view of one embodiment of an embossing apparatus for forming in a record card three protuberances of novel configuration, the apparatus being shown in a position before the formation of protuberances.

Referring now in greater detail to the drawing, and first to FIG. 1, there is shown an embossing apparatus for producing three spaced protuberances in a record card 6. The apparatus comprises a reciprocable male die member or ram 1 which is formed with several parallel downwardly extending embossing elements preferably assuming the shape of cylindrical pins or studs 2 each formed with a conical or similiarly shaped pointed end portion 3. The stationary part of the embossing apparatus comprises a female die member or bed 4 which is formed with parallel vertical bores 5 aligned with the pins 2 and whose upper side supports the aforementioned record card 6. The latter normally consists of paper or a like material capable of receiving printed matter from a type carrier or the like. The ram 1 is reciprocable toward and away from the female die member 4 and, when caused to descend into the position of FIG. 2 (arrow *a*), the pointed ends 3 of pins 2 penetrate through the card 6 to form therein protuberances of the type shown in FIG. 3. The protuberances extend beyond the underside or lower major surface of the record card.

Each protuberance comprises a funnel-shaped body portion or hollow conical wall 8 whose bottom zone has a small puncture or aperture 7 formed by the pointed end 3 of the corresponding stud or pin 2. During the formation of such protuberances, the material of the card 6 (i.e. the funnel-shaped wall 8) is depressed into the corresponding bore 5 in the female die member 4 (see FIG. 2), and the extent to which the ram 1 descends is controlled by suitable stops (not shown) in order to prevent complete penetration of pins 2 into the respective bores 5. The ram is then caused to return into the position of FIG. 1 to permit convenient withdrawal of the perforated record card 6. FIG. 3 also shows that the wall 8 of a punctured protuberance and the main body portion of the record card 6 define therebetween a sharp circular edge 9 which can be readily detected by the sensing element 10 (shown in phantom lines).

Figure 2:
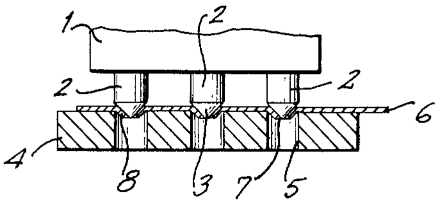
FIG. 2 is a similar view of the embossing apparatus in actual operation, i.e. during the formation of funnel-shaped punctured or apertured protuberances in the record card.
Figure 3:
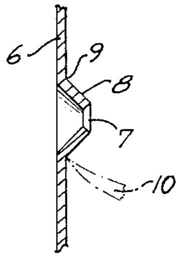
FIG. 3 is an enlarged section through one protuberance formed in the record card by the embossing apparatus of FIGS. 1 and 2.

As can be observed in FIGS. 1 and 2, each card may be formed with several preferably uniformly spaced protuberances so as to insure contact with a sensing element even if the card is very loosely guided through a business machine, i.e. even if the card has substantial lateral play during its travel with respect to the sensing means 10.

Figure 4:
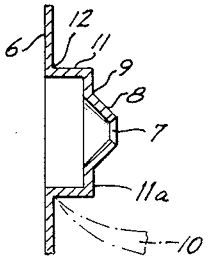
FIG. 4 is a similar section through a modified protuberance of a record card.

Referring now to FIG. 4, there is shown a slightly modified protuberance which consists of an elongated, preferably rectangular depression or pocket 11 formed by bending a certain area of the record card 6 out of the latter's general plane. The embossing further comprises at least one funnel-shaped wall 8 formed with an aperture or puncture 7. A sharp edge 9 is formed between the bottom the bottom wall 11a of the pocket 11 and the funnel-shaped wall 8 of the protuberance. A second sharp edge 12 (shown engaged by the phantom-line sensing element 10) develops between the main body portion of the record card 6 and the peripheral wall of the pocket 11. An advantage of the construction shown in FIG. 4 is in that it can operate a sensing element even if the wall 8 or the pocket 11 is accidentally deformed because the sensing element 10 can engage with either of the edges 9 and 12.

The pocket or depression 11 of the protuberance shown in FIG. 4 may be of rectangular or oval shape and may carry one, two, three or more funnel-shaped punctured projections or walls 8 thereon. Such pocket may be formed in an embossing apparatus of the type shown in FIG. 5 This somewhat modified apparatus comprises a female die member or bed 4' whose upper side is formed with a shallow recess 13 of a depth corresponding to desired depth of the pocket or depression 11. The bores 5' communicate with the recess 13 and receive the conical studs or embossing elements 3' carried by the male die member or ram 1' when the latter descends into the recess 13. The points of the studs 3' then form the aforementioned apertures or punctures 7 in the funnel-shaped walls 8 of each projection on the depression or pocket 11. The width of the pocket 11 preferably slightly exceeds the maximum diameters of hollow conical walls 8 (FIG. 4).

While the drawing shows a device for forming funnel-shaped walls 8 for the apertured protuberances on a record card 6, it is equally possible to use a pyramidal or otherwise shaped tool capable of producing correspondingly contoured protuberances, as long as at least one aperture are puncture is formed in each protuberance. The formation of punctures in depressed or embossed zones of the card eliminates internal stresses which develop when a non-apertured depression is formed; such stresses tend to return the depressed portion into the general plane of the paper sheet or card. It has been found that the embossed zones or protuberances of the type shown in FIGS. 3 and 4 are capable of withstanding surprisingly high pressures as well as extensive friction, wear and tear during the passage through a business machine or during handling, without becoming flattened to an extent such that a sensing element would fail to react. In addition, owing to the preferably funnel-shaped wall formation on each protuberance, the likelihood that the protuberances would snap over to the opposing side of a record card is fully avoided. This is due to the fact that the formation of one or more apertures in each protuberance prevents the generation of internal tensions in the material of a record card which pressures, in prior constructions of the type formed with non-perforated depressions, tend to flatten the depressions or to cause the inversion (i.e. snapping-over) of protuberances to the opposing side of a record card where they cannot be reached by the sensing element. It will be noted that the formation of apertures 7 in the walls 8 of projections shown in FIGS. 3 and 4 occurs without separation of fragments from the material of a record card.

Figure 5:
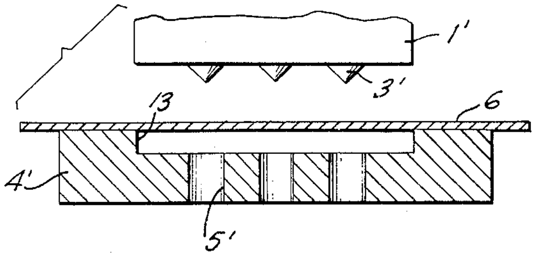
FIG. 5 shows a modified embossing apparatus for the formation of punctured protuberances of the type illustrated in FIG. 4.

A very important advantage of the embossing apparatus shown in FIGS. 1, 2 and 5 is in that it can be utilized for embossing of very heavy or extremely thin stock, and in that the embossing can be carried out at comparatively low pressures since only the pointed ends or tips 3, 3' must pentrate through the material of the cards. In certain aforementioned prior constructions, comparatively large edges on a cutting knife and a counterknife must penetrate into the card to form a slit therein. The use of a female die member or matrix 4, 4' with bores 5, 5', respectively, for the pointed embossing elements 3, 3' insures that the embossing is carried out with great accuracy and that the protuberances are formed with sharp edges to facilitate the scanning action of a sensing element.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. As a novel article of manufacture, a record card for business machines and the like having a major surface and at least one substantially funnel-shaped apertured protuberance projecting from said major surface for engagement with a sensing element when the card is advanced through the machine.

2. As a novel article of manufacture, a record card for business machines and the like having a major surface and at least one substantially pyramidal apertured protuberance projecting from said major surface for engagement with a sensing element when the card is advanced through the machine.

3. As a novel article of manufacture, a record card for business machines and the like having a major surface and a plurality of aligned, uniformly spaced, substantially funnel-shaped protuberances projecting from said major surface for engagement with a sensing element when the card is advanced through the machine, each protuberance having a puncture at its deepest point for relieving internal stresses in the material of the card.

4. As a novel article of manufacture, a record card for business machines and the like having a major surface, a pocket-like depression embossed in and projecting from said major surface, and at least one apertured protuberance projecting from said depression, said depression and said protuberance being engageable by a sensing element when the card is advanced through the machine.

5. As a novel article of manufacture, a record card for business machines and the like having a major surface, a substantially rectangular pocket-like depression embossed in and projecting from said major surface, and a plurality of substantially funnel-shaped protuberances projecting from said depression, each protuberance having a puncture at its deepest point most distant from said major surface, the depression and said protuberances being engageable by a sensing element when the card is advanced through the machine.

6. As a novel articles of manufacture, a record card for business machines and the like having a major surface, an elongated, substantially oval, pocket-like depression embossed in and projecting from said major surface, and a plurality of spaced pointed protuberances projecting from said depression, each protuberance having at least one puncture for relieving internal stresses in the material of the card, said depression and said protuberances being adapted to engage with a sensing element when the card is advanced through a business machine.

7. As a novel article of manufacture, a record card for business machines and the like having a major surface, an elongated pocket-like depression embossed in and projecting from said major surface, and at least one apertured protuberance projecting from said depression, said protuberance having the shape of a hollow cone and having a maximum-diameter zone adjacent to the depression and of a diameter less then the width of said depression, said depression and said protuberance being engageable by a sensing element when the card is advanced through the machine.

8. As a novel article of manufacture, a record card for business machines or the like, having a major surface and at least one tapering hollow protuberance projecting from said major surface and being apertured at the free end thereof and serving for engagement with a sensing element when the card is advanced through the machine, said hollow protuberance having substantially the same wall thickness as the remainder of the record card.

References Cited in the file of this patent

UNITED STATES PATENTS

| | | |
|---|---|---|
| 1,936,783 | Chase | Nov. 28, 1933 |
| 2,017,921 | Rothman | Oct. 22, 1935 |
| 2,273,740 | Terry | Feb. 17, 1942 |
| 2,307,617 | Braun | Jan. 5, 1943 |
| 2,650,024 | Ferrin | Aug. 25, 1953 |
| 2,858,073 | Taube | Oct. 28, 1958 |